(12) United States Patent
Longo-Schedel et al.

(10) Patent No.: US 10,808,116 B2
(45) Date of Patent: Oct. 20, 2020

(54) PROCESS FOR PRODUCING IN-SITU FOAM

(71) Applicant: BASF SE, Ludwigshafen am Rhein (DE)

(72) Inventors: Daniela Longo-Schedel, Sankt Augustin (DE); Hans-Joachim Hähnle, Neustadt (DE); Rebekka Von Benten, Ludwigshafen (DE); Frank Reuter, Undenheim (DE)

(73) Assignee: BASF SE (DE)

( * ) Notice: Subject to any disclaimer, the term of this patent is extended or adjusted under 35 U.S.C. 154(b) by 94 days.

(21) Appl. No.: 15/769,101

(22) PCT Filed: Oct. 6, 2016

(86) PCT No.: PCT/EP2016/073917
§ 371 (c)(1),
(2) Date: Apr. 18, 2018

(87) PCT Pub. No.: WO2017/067792
PCT Pub. Date: Apr. 27, 2017

(65) Prior Publication Data
US 2018/0298183 A1    Oct. 18, 2018

(30) Foreign Application Priority Data
Oct. 20, 2015    (EP) .................................... 15190531

(51) Int. Cl.
| | | |
|---|---|---|
| *C08L 39/02* | (2006.01) | |
| *C08J 9/00* | (2006.01) | |
| *C08J 9/30* | (2006.01) | |
| *C04B 38/10* | (2006.01) | |
| *C04B 26/04* | (2006.01) | |
| *C04B 26/06* | (2006.01) | |
| *C08J 9/06* | (2006.01) | |
| *C08K 5/07* | (2006.01) | |
| *C04B 111/28* | (2006.01) | |
| *C04B 103/00* | (2006.01) | |

(52) U.S. Cl.
CPC ............. *C08L 39/02* (2013.01); *C04B 26/04* (2013.01); *C04B 26/06* (2013.01); *C04B 38/10* (2013.01); *C08J 9/0004* (2013.01); *C08J 9/009* (2013.01); *C08J 9/0066* (2013.01); *C08J 9/0095* (2013.01); *C08J 9/06* (2013.01); *C08J 9/30* (2013.01); *C08K 5/07* (2013.01); *C04B 2103/0062* (2013.01); *C04B 2111/28* (2013.01); *C08J 2201/026* (2013.01); *C08J 2207/04* (2013.01); *C08J 2333/02* (2013.01); *C08J 2333/24* (2013.01); *C08J 2339/02* (2013.01); *C08L 2201/02* (2013.01); *C08L 2201/54* (2013.01); *C08L 2312/00* (2013.01)

(58) Field of Classification Search
CPC .. C08L 39/02; C08L 2201/02; C08L 2201/54; C08L 2312/00; C04B 26/04; C04B 26/06; C04B 38/10; C04B 2103/0062; C04B 2111/28; C08J 9/0004; C08J 9/0006; C08J 9/009; C08J 9/0095; C08J 9/30; C08J 2201/02; C08J 2207/04; C08J 2333/02; C08J 2333/24; C08J 2339/02
USPC ......................................................... 524/555
See application file for complete search history.

(56) References Cited

U.S. PATENT DOCUMENTS

| | | | |
|---|---|---|---|
| 7,951,265 B2 | 5/2011 | Esser et al. | |
| 8,097,126 B2 | 1/2012 | Haehnle et al. | |
| 8,822,557 B2 | 9/2014 | Ulanova et al. | |
| 8,926,797 B2 | 1/2015 | Jehn-Rendu et al. | |
| 2011/0034571 A1* | 2/2011 | Hahn | ...................... C04B 38/02 521/50.5 |
| 2011/0049411 A1* | 3/2011 | Ulanova | .................. C04B 38/02 252/62 |
| 2015/0252164 A1 | 9/2015 | Simancas et al. | |

FOREIGN PATENT DOCUMENTS

| | | | | |
|---|---|---|---|---|
| CA | 2367730 | A1 | 9/2000 | |
| CA | 2883585 | A1 * | 3/2014 | ............. C04B 26/16 |
| DE | 2542471 | A1 | 4/1977 | |
| DE | 19912988 | C1 | 8/2000 | |
| JP | H11279318 | A | 10/1999 | |
| WO | WO-2004087818 | A1 | 10/2004 | |

(Continued)

OTHER PUBLICATIONS

European Search Report for EP Patent Application No. 15190531.2, dated Jan. 26, 2016, 3 pages.

(Continued)

*Primary Examiner* — Michael Bernshteyn
(74) *Attorney, Agent, or Firm* — Faegre Drinker Biddle & Reath LLP

(57) ABSTRACT

A process for producing an in-situ foam comprising the following mixing components:
- one or more inorganic fillers A) at from 50 to 98 wt %,
- one or more cationic or amphoteric polymers B) at from 1 to 48 wt %,
- one or more surfactants C) at from 0.5 to 48 wt %,
- one or more crosslinkers D) capable of reacting with said polymers B) at from 0.01 to 5 wt %,
- one or more cell regulators E), selected from silicones, siliconates and carbon, at from 0.5 to 10 wt %,
- one or more additives F) at from 0 to 20 wt %,
wherein the weight percentages of said components A) to F) are based on the nonaqueous fractions and the sum total of A) to F) adds up to 100 wt %.

18 Claims, 1 Drawing Sheet

(56) References Cited

FOREIGN PATENT DOCUMENTS

| WO | WO-2005012637 A1 | 2/2005 |
| WO | WO-2008007187 A2 | 1/2008 |
| WO | WO-2009109537 A1 | 9/2009 |
| WO | WO-2010145956 A1 | 12/2010 |
| WO | WO-2011051170 A1 | 5/2011 |
| WO | WO-2014044604 A1 | 3/2014 |

OTHER PUBLICATIONS

International Preliminary Report on Patentability for PCT/EP2016/073917 dated Dec. 12, 2017.
International Search Report for PCT/EP2016/073917 dated Nov. 8, 2016.
Written Opinion of the International Searching Authority for PCT/EP2016/073917 dated Nov. 8, 2016.

* cited by examiner

PROCESS FOR PRODUCING IN-SITU FOAM

CROSS-REFERENCE TO RELATED APPLICATIONS

This application is a national stage application (under 35 U.S.C. § 371) of PCT/EP2016/073917, filed Oct. 6, 2016, which claims benefit of European Application No. 15190531.2, filed Oct. 20, 2015, both of which are incorporated herein by reference in their entirety.

DETAILED DESCRIPTION OF THE INVENTION

Figure 1:
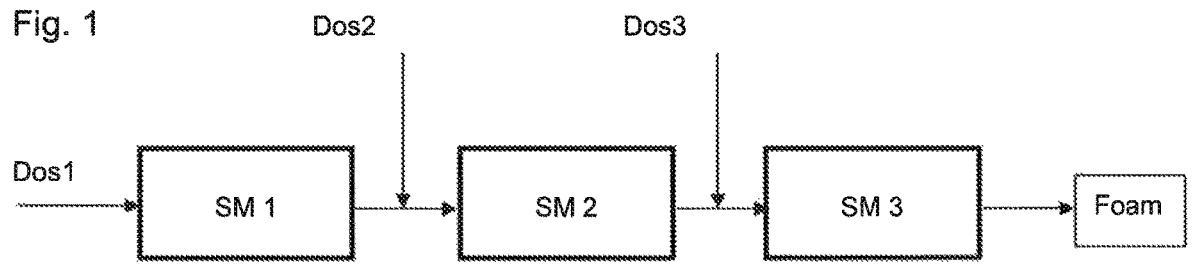
FIGS. 1, 2, 3, and 4 show schematic depictions of suitable apparatuses for producing the in-situ foam.

The present invention relates to a system and a process for producing an in-situ foam and also to the use of said foam.

In-situ foams based on urethanes, curable amino resin condensates or phenolic resins are well known. A disadvantage is that they shrink on drying and are flammable. DE 25 42 471 describes a process for producing low-shrinkage foams from curable amino resin condensates in the presence of shrinkage- and flammability-reducing reaction products of orthoboric acid and polyhydric alcohols or polyalkylene glycol ethers of polyhydric alcohols.

WO 2011/051170 describes a process for producing an elastic organic-inorganic hybrid foam having good heat and sound absorption properties. The foam is obtained by foaming a mixture of gypsum or kaolin, an aqueous polyvinylamine solution, a volatile organic compound as blowing agent, an emulsifier and crosslinker. Owing to the blowing agents used, flush filling of cavities with foam is not possible.

WO 2009/109537 describes a process for producing a foam having a high level of flame resistance and a low density by curing a mechanically, physically or chemically blown foam from an aqueous composition comprising alkali metal silicates, surfactants and an aqueous polymer dispersion. Film formation by drying the polymer dispersion is too slow for application as in-situ foam.

JP-A 11-279318 describes a flame-resistant spray foam based on polyurethanes which is obtained by mixing an aqueous phosphoric acid solution and optionally inorganic fillers with a mixture of NCO-containing urethane prepolymers and calcium carbonate under superatmospheric pressure.

DE 199 12 988 C1 discloses filled foams based on polyurethanes and their usefulness as insulation/insulant materials and also as fire protection foams.

WO 2008/007187 describes a hybrid foam based on polyurethanes and inorganic fillers that has good thermal and acoustical insulation properties, permeability and flame retardancy and also good adherence to concrete.

When polyurethane-based in-situ foams are used for filling nearly closed cavities, the formation of $CO_2$ in the reaction of the components can lead to such a high build-up of pressure in the cavities that the walls burst.

WO 2014/044604 describes a system for producing an in-situ foam, said system comprising the components
one or more inorganic fillers A) at from 50 to 98 wt %,
one or more water-soluble cationic polymers B) at from 1 to 48 wt %,
one or more surfactants C) at from 0.5 to 48 wt %,
one or more crosslinkers D) capable of reacting with said polymers B) at from 0.01 to 5 wt %,
one or more additives E) at from 0 to 20 wt %,
wherein the weight percentages of said components A) to E) are based on the nonaqueous fractions and the sum total of A) to E) adds up to 100 wt %, and also a process for producing an in-situ foam by using the components of said system and foaming with a gas or gas mixture, and the use for thermal insulation and filling of cavities and hollow bodies. The thermal conductivity of this in-situ foam is still too high for some applications in insulation.

The problem addressed by the present invention was that of remedying the abovementioned disadvantages and providing a system and process for producing a low-density in-situ foam having a fine-cell, homogeneous foam structure and a reduced level of thermal conductivity in both the dry state and the humidity-conditioned state.

The problem was solved by a system producing an in-situ foam, said system comprising the components
one or more inorganic fillers A) at from 50 to 98 wt %, preferably 85 to 95 wt %,
one or more cationic or amphoteric polymers B) at from 1 to 48 wt %, preferably 2 to 10 wt %,
one or more surfactants C) at from 0.5 to 48 wt %, preferably 1 to 10 wt %,
one or more crosslinkers D) capable of reacting with said polymers B) at from 0.01 to 5 wt %, preferably 0.1 to 1 wt %,
one or more cell regulators E), selected from silicones, siliconates and carbon, at from 0.5 to 10 wt %, preferably 1 to 5 wt %,
one or more additives F) at from 0 to 20 wt %, preferably 1 to 10 wt %,
wherein the weight percentages of said components A) to F) are based on solids or the nonaqueous fractions and the sum total of A) to F) adds up to 100 wt %.

Component A)

Component A) of the system comprises one or more inorganic fillers, in particular minerals, for example colloidal silica, silicates, such as aluminum silicates, in particular kaolin $Al_2O_3*2SiO_3*2\ H_2O$ or kaolinite $Al_4[(OH)_8Si_4O_{10}]$, sulfates such as calcium sulfate, in particular water-containing sulfates $Ca[SO_4].n\ H_2O$ where $n=½, 2$ (gypsum), or mixtures thereof. Particular preference is given to calcium sulfate, FGD gypsum from flue gas desulfurizers, aluminum silicates, in particular kaolin or mixtures thereof.

Component A is preferably employed as surface-modified mineral when minimal shrinkage is required of the in-situ foam during drying. Surface functionalization preferably takes the form of modification with amino, carboxyl and/or hydroxyl groups.

The average particle diameter of component A) is preferably in the range from 0.1 to 10 µm. Components A) preferably have an apparent density in the range from 2 to 3 $kg/m^3$ and/or a bulk density in the range from 0.3 to 2 $kg/m^3$.

Component B)

Component B) of the system comprises one or more cationic or amphoteric polymers. Preference is given to those which bear primary or secondary amino groups. Polymer B) is generally water soluble, i.e., its solubility in water is not less than 5 wt %, preferably not less than 8 wt % under standard conditions (20° C., 101.3 kPa) at pH 7. Amphoteric polymers have a pH-dependent solubility in water. Said polymers are water soluble in different pH ranges, depending on their composition. Preference is given to polymers that are soluble at above pH 6, more preferably at from pH 7.5 to pH 12. Polymers B are generally employed in the form of an aqueous solution, preferably at a concentration of not less than 50 g/l, particularly not less than 80 g/l.

Examples of cationic polymers B comprise one or more structural units selected from vinylamine, allylamine, ethyleneimine, vinylimidazole, N-alkylaminoethyl acrylate, N-alkylaminoethyl methacrylate, N-alkylaminopropylacrylamide, N-alkylaminopropylacrylamide.

It is likewise possible to employ polymers that bear primary or secondary amino groups and are based on renewable raw materials such as saccharides, e.g., chitosan.

Particularly the chain growth addition polymers described in WO 2010/145956, comprising vinylamide units, and/or the copolymers obtainable by subsequent partial or complete elimination of formyl groups out of the polymerized N-vinylformamide units in said polymer to leave amino groups are suitable.

Preference is given to polymers obtained by complete or partial hydrolysis of polymers obtainable by chain growth addition polymerization of at least one monomer of the formula

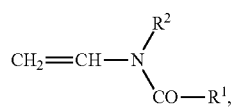

where $R^1$ and $R^2$ are each H or $C_1$-$C_6$ alkyl. Preferred monomers of formula (I) are N-vinylformamide, N-vinyl-N-methylformamide, N-vinylacetamide, N-vinyl-N-methylacetamide, N-vinyl-N-ethylacetamide, N-vinyl-N-methylpropionamide and N-vinylpropionamide.

Particular preference is given to polyvinylamine or poly (vinylamine-vinylformamide) copolymers.

Charge densities for cationic or amphoteric polymers B (without counter-ions) are generally in the range of 1 and 23 meq/g, preferably in the range of 2 and 14 meq/g, more preferably in the range of 3 and 11 meq/g. Weight average molecular weights are typically in the range from 50 000 to 8 000 000, preferably in the range from 100 000 to 5 000 000, more preferably in the range from 200 000 to 3 000 000. Particular preference is given to polyvinylamines and copolymers thereof as marketed under the brand name of Lupamin®. Examples are Lupamin® 9030, Lupamin®9050, Lupamin®9095.

Usage of amphoteric polymers B) provides in-situ foams of particularly low thermal conductivity, in particular after humidity conditioning. Suitable amphoteric polymers are for example described in WO 2004/087818 and WO 2005/012637. Preference is given to copolymers comprising units derived from vinylamine and vinylformamide or from vinylamine and unsaturated carboxylic acids/carboxylic acid salts and terpolymers comprising units derived from vinylamine, vinylformamide and unsaturated carboxylic acids/carboxylic acid salts. Particular preference is given to copolymers formed from vinylamine and sodium acrylate and terpolymers formed from vinylamine, vinylformamide and sodium acrylate. XELOREX® F 3000 may be mentioned by way of example.

Component C)

Component C) of the system comprises one or more surfactants used to form and stabilize the foam. Anionic, cationic, nonionic or amphoteric surfactants are usable.

Suitable anionic surfactants are diphenylene oxide sulfonates, alkane- and alkylbenzenesulfonates, alkylnaphthalenesulfonates, olefinsulfonates, alkyl ether sulfonates, alkyl sulfates, alkyl ether sulfates, alpha-sulfofatty acid esters, acylaminoalkanesulfonates, acylisethionates, alkyl ether carboxylates, N-acylsarcosinates, alkyl and alkyl ether phosphates. Useful nonionic surfactants include alkylphenol polyglycol ethers, fatty alcohol polyglycol ethers, fatty acid polyglycol ethers, fatty acid alkanolamides, EO-PO block copolymers, amine oxides, glyceryl fatty acid esters, sorbitan esters and alkylpolyglucosides. Useful cationic surfactants include alkyltriammonium salts, alkylbenzyldimethylammonium salts and alkylpyridinium salts.

Mixtures of anionic and nonionic surfactants are employed with particular preference.

Reduced densities are attainable in a preferred manner by employing surfactants based on natural proteinaceous raw materials and in a particularly preferred manner by employing alcohol-resistant protein-type foaming agents. Surfactant mixtures of this type are commercially available, for example as products of the Schaumgeist® range marketed by Dr. Sthamer of Hamburg.

Component D)

Component D) of the system comprises one or more crosslinkers D) capable of reacting with component B). Preference for use as crosslinkers is given to at least bifunctional compounds having functional groups comprising aldehydes, ketones, isocyanates, epoxides, acrylates, acrylamides, esters or vinylsulfonates. Di- or polyaldehydes are preferable and ethanedial is particularly preferable.

Component E)

Component E) of the system comprises one or more cell regulators. Cell regulators ensure a homogeneous and finely cellular structure and a lower level of thermal conductivity on the part of the in-situ foam in the dried state. Useful cell regulators include, for example, silicones or siliconates, for example the products of the Tegostab® range of Evonik Industries or siliconates as for example on offer as products of the SilRes® range of Wacker Chemie, the use of alkylsiliconates being preferred.

Carbon is also useful as component E), particularly in the form of graphite. Carbon acts as a cell regulator in the system for producing an in-situ foam and in the present invention is not employed as an inorganic filler (component A). Preference is given to graphite having an average particle size of 1-50 μm, in particular of 2.5-12 μm. Bulk density is preferably in the range of 100-500 g/l. Specific surface area is preferably in the range of 5-20 m²/g. Natural graphite or ground synthetic graphite is employable for example.

Component F)

Component F) of the system, if present, comprises one or more additives other than components A) to E). Possible additives include specifically compounds that reduce shrinkage or water imbibition, deliver processing advantages.

Useful shrinkage reducers include, for example, dimethyldihydroxyethylurea or sugar derivatives such as, for example, sorbitol.

Self-crosslinking styrene-acrylate dispersions, for example, are useful for reducing water imbibition.

Foamability is improvable by adding viscosity-influencing additives, e.g., starch, modified celluloses, guar bean flour ether, polyvinyl alcohol or functionalized alkyldioxysilanes or alkyltrioxysilanes, for example 3-aminopropyltriethoxysilane.

The system does not contain any volatile organic blowing agents, such as low-boiling $C_4$-$C_8$ hydrocarbons, alcohol, ethers, ketones and esters.

For fire protection to be good, the proportion of organic constituents in the in-situ foam should be as low as possible. Preference is given to employing a system wherein the proportion of organic constituents is so low that the in-situ foams pass the B1 fire test of DIN 4102 and is fire resistant to F30 when 50 mm in thickness and to F60 when 100 mm in thickness. Total solids (nonaqueous fractions) of components B), C), D), E) and F) is therefore preferably in the range from 2 to 20 wt %, more preferably in the range from 5 to 15 wt %, based on the in-situ foam.

The invention also provides a process for producing an in-situ foam by using the above-described components A) to F) of the system and foaming with a gas or gas mixture.

The in-situ foam is obtainable by mixing and foaming an aqueous composition comprising components A) to F) with a gas or gas mixture under superatmospheric pressure and applying mechanical forces, such as stirring or shearing by means of static mixers. It is also possible to foam the aqueous composition by dispersing an inert gas in the form of fine bubbles of the gas. The introduction of gas bubbles into the aqueous composition will be effected by means of beating, shaking, stirring, whip-stator or rotor devices. Preference is given to using mixers having stator and/or rotor elements.

The gas or gas mixture used preferably comprises inert gases, such as nitrogen, argon, carbon dioxide or oxygen. Air is used with particular preference.

The process preferably comprises the steps of
(a) introducing a gas or gas mixture into an aqueous solution or suspension comprising at least said component C) and preferably D),
(b) foaming the aqueous solution or suspension via one or more mixing elements,
(c) feeding A), B), E) and F) together or separately via one or more mixing elements to the foam system,
(d) drying to a water content below 5 wt %.

It is preferable to introduce compressed air into step (a) at a pressure in the range from 10 to 3000 kPa, preferably in the range from 100 to 2000 kPa.

Admixing components A) to F) may be effected together or separately via one or more than one mixing element. It is preferred for components B) and D) of the system and/or premixes comprising these components to be stored separately and only to be mixed together on site (in situ) to produce the in-situ foam. Production is preferably effected via various feedpoints of the apparatus.

The in-situ foam is obtainable in commercially available foaming apparatuses for in-situ foams. Suitable apparatuses for producing the in-situ foam (Foam) are schematically depicted in FIGS. 1-4.

The apparatus shown in FIG. 1 consists of three static mixers (SM 1, SM 2 and SM 3) having three metering devices (Dos1, Dos2 and Dos3). It is preferred to admix components C) and D) optionally E) and the gas or gas mixture via metering device (Dos1), components A), B) and E) conjointly via metering device (Dos2) and component F) via metering device (Dos3).

Figure 2:
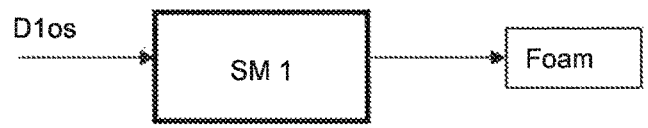

The apparatus shown in FIG. 2 consists of only one static mixer (SM 1) having the metering devices (Dos1) for admixing the aqueous composition comprising components A) to F).

Figure 3:
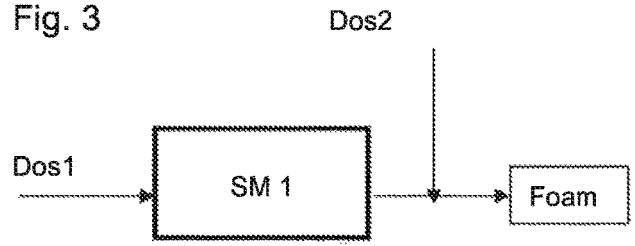

The apparatus shown in FIG. 3 corresponds to the apparatus shown in FIG. 2 with an additional metering device (Dos2). Here it is possible to admix components A) to E) conjointly via metering device Dos1 and, separately therefrom, component F) via metering device Dos2.

Figure 4:
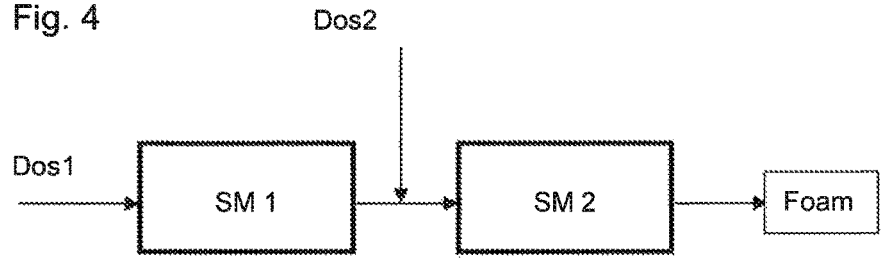

The apparatus shown in FIG. 4 is a simplified form of the apparatus shown in FIG. 1. It consists of two static mixers (SM 1 and SM 2) having two metering devices (Dos1 and Dos2). It is preferred to admix components C), D), and optionally one or more components E) and the gas or gas mixture via metering device (Dos1), components A), B) and F) and optionally one or more further components E) conjointly via metering device (Dos2).

Components B)-D) are generally employed in the form of aqueous solutions. To adjust the viscosity, further water may be added to individual components or mixtures of components. The solids content of the aqueous suspension in the last mixing element is preferably in the range from 5 to 50 wt %, more preferably from 10 to 30 wt %.

The invention also provides an in-situ foam obtainable by the process of the invention. Density can be varied between wide limits depending on the pressure setting, the number of mixing elements and the foaming equipment used. In-situ foam density is preferably in the range from 10 to 300 kg/m$^3$, more preferably in the range from 20 to 50 kg/m$^3$. The thermal conductivity $\lambda$ of the dried in-situ foam, as determined to DIN EN 12667 (May 2001), is preferably below 36 mW/K*m, more preferably in the range from 30 to 35 mW/K*m. Thermal conductivity $\lambda$, moist following conditioning at 80% humidity and 23° C. to constant weight is preferably in the range from 32 to 41 mW/K*m. The in-situ foam preferably has a heat of combustion, determined according to DIN 51900 part 3, below 3.0 MJ/kg.

The in-situ foam is useful for thermal insulation and for filling cavities and hollow bodies, in particular for cavity insulation in buildings, for example in double-leaf masonry. The in-situ foam is further useful for interior insulation of buildings, particularly in relation to walls, ceilings, crawlspaces and roofs, for the foam filling of cavity blocks to improve insulation performance, for insulation of pipework lines and technical components, for fire-safe enclosure of brickwork ducts for, for example, line feedthroughs, and also for infilling fire-safe window profiles, doors and sectional gates. The in-situ foam is also useful as a fire barrier or as part of a fire barrier in buildings and for filling cavities and hollow bodies.

The in-situ foam is usable for these and other applications not only alone but also in combination with one or more other insulating materials in the form of sheets or flakes. Suitable insulating materials are foamed plastics, such as bead foams comprising white or gray expandable polystyrene (EPS, Styropor®, Neopor®) or styrene extrusion foams (XPS, Styrodur®) or polyurethane foams (PU), foamed elastomers based on neoprene rubber or EPDM, inorganic insulants, such as mineral fibers, rock wool, glass wool, glass foam pellets, foam glass, expandable pearlite or silicate foams, natural insulants such as sheep's wool, flax, softwood fiberboard panels, lightweight wood wool construction panels, cork, coir mats or cellulose. The in-situ foam of the present invention may be used with preference together with mineral wool.

EXAMPLES

Materials Used:
Component A1 Translink® 445 (surface-modified kaolin having an average particle size of 1.4 µm)
Component A2 FGD gypsum (from a flue gas desulfurizer), $CaSO_4.2H_2O$. Calcium sulfate dihydrate
Component A3 Ansilex® 93 (calcined kaolin, not surface treated, average particle size 0.9 µm)

Component B1 Lupamin® 4570 (copolymer of vinylamine, vinylformamide (7:3 molar) having a medium molecular weight, solids content 31%)

Component B2 Xelorex® F3000 (terpolymer of vinylamine, vinylformamide and sodium acrylate (35:35:30 molar), amphoteric, having a high molecular weight, solids content 10-12 wt %)

Component B3 Lupamin® 9050 (copolymer of vinylformamide and vinylamine (1:1 molar) of high molecular weight; solids content 16.5%), Component C1 Schaumgeist® Omega % (alcohol-resistant protein-type foaming agent based on natural proteinaceous raw materials, foam stabilizers and antifreeze, Dr. Sthamer, Hamburg)

Component C2 surfactant mixture of an anionic surfactant and a nonionic surfactant: Disponil FES 32 (sodium lauryl polyether sulfate) and Lutensol AT80 (fatty acid ethoxylate) in a weight ratio of 1:3;

Component C3 Schaumgeist® 6% (protein-type foaming agent based on natural proteinaceous raw materials, foam stabilizers and antifreeze, Dr. Sthamer, Hamburg)

Component D1 glyoxal (ethanedial, oxalaldehyde)

Component E1 aqueous solution of potassium methylsiliconate

Component E2 UF995 graphite

Component F1 3-aminopropyltriethoxysilane

Methods of Measurement:

The density of the foam sample was determined by weighing and measuring the length, width and height.

The heat of combustion was determined according to DIN 51900 Part 3.

To determine water imbibition (wt %) the foam samples were conditioned at 80% humidity and 23° C. to constant weight.

Sliceability after foaming was determined using a knife and a chronometer. A sample is deemed sliceable when a piece of the sample can be cut off and lifted without losing its shape.

To determine shrinkage, the foam samples were conditioned at 80% humidity and 23° C. to constant weight and measured for dimensional changes.

Thermal conductivity $\lambda$ was determined by measuring the heat flow in the single plate apparatus of DIN EN 12667 (May 2001). Thermal conductivity $\lambda$, moist was determined after conditioning at 85% humidity and 23° C. to constant weight.

Examples 1-7

A setup as per FIG. 1 having two static mixing elements (SM 1, SM 2) with diameters between 20 and 50 mm was used to foam an aqueous solution of components C) and D) and E1 with compressed air (500 kPa) in the first mixing element SM 1 for Examples 1-7. A mixture of components A), B) and F) and, in the case of Example 7, E2 and optionally additional water to adjust the solids content of the suspension was then admixed via feedpoint Dos2 and sent to the second mixing element SM2. As a result of the setup being pressurized with compressed air upstream of the first mixing element, the foam is transported through the further mixing elements to the outlet nozzle. Drying took place in air at 20° C.

Comparative Tests V1 and V2

A setup as per FIG. 1 having three static mixing elements (SM 1, SM 2 and SM 3) with diameters between 5 and 10 mm was used to foam an aqueous solution of component C with compressed air (2000 kPa) in the first mixing element SM 1. A mixture of components A2, A3, B3 and optionally F1 and optionally additional water to adjust the solids content of the suspension was then admixed via the second mixing element SM 2. This was finally followed in the third mixing element SM 3 by metered addition of component D1 and homogenization. As a result of the setup being pressurized with compressed air upstream of the first mixing element, the foam is transported through the further mixing elements to the outlet nozzle. Drying took place in air at 20° C.

Comparative Test V3

Comparative Test V3 was prepared in accordance with Examples 1-7 as per FIG. 4.

Table 1 shows components A to F for producing the in-situ foams in weight percent, each based on the nonaqueous fraction. The solids content (nonaqueous fraction) in weight percent is based on the mixture of all components downstream of the last feedpoint.

Table 2 shows the properties of the dried in-situ foams. Thermoconductivity $\lambda$, moist was determined after conditioning at 80% humidity and 23° C. to constant weight.

TABLE 1

Materials used for in-situ foams of Examples B1 to B7 and Comparative Tests V1 to V3 in weight percent based on the nonaqueous fraction of the components

| Component | Units | B1 | B2 | B3 | B4 | B5 | B6 | B7 | V1 | V2 | V3 |
|---|---|---|---|---|---|---|---|---|---|---|---|
| A1 | [weight %] | 86.5 | 86.3 | 86.0 | 84.5 | 84.8 | 84.6 | 82.2 | | | 87.6 |
| A2 | [weight %] | | | | | | | | 62.2 | 62.4 | |
| A3 | [weight %] | | | | | | | | 31.0 | 31.1 | |
| B1 | [weight %] | 8.7 | 8.6 | 8.6 | | | | | | | 10.2 |
| B2 | [weight %] | | | | 8.5 | 8.5 | 8.5 | 8.2 | | | |
| B3 | [weight %] | | | | | | | | 5.0 | 5.0 | |
| C1 | [weight %] | 2.3 | 2.4 | 2.6 | 3.5 | 3.3 | 3.3 | 3.6 | | | 1.2 |
| C2 | [weight %] | | | | | | | | 1.4 | 1.4 | |
| D1 | [weight %] | 0.3 | 0.3 | 0.3 | 0.4 | 0.4 | 0.4 | 0.4 | 0.2 | 0.2 | 0.14 |
| E1 | [weight %] | 1.5 | 1.5 | 1.7 | 2.3 | 2.2 | 2.3 | 2.4 | | | |
| E2 | [weight %] | | | | | | | 2.5 | | | |
| F1 | [weight %] | 0.9 | 0.9 | 0.9 | 0.8 | 0.8 | 0.8 | 0.8 | | 0.3 | 0.9 |

TABLE 2

| Properties of dried in-situ foams of Comparative Tests V1 to V3 and of Examples B1 to B7 | | | | | | | | | | | |
|---|---|---|---|---|---|---|---|---|---|---|---|
| Property | Units | B1 | B2 | B3 | B4 | B5 | B6 | B7 | V1 | V2 | V3 |
| Density | [kg/m$^3$] | 47 | 38.3 | 41.3 | 25.5 | 26.7 | 36.2 | 27.3 | 50.7 | 26.9 | 46.1 |
| Thermal cond. λ, (dry) | [mW/m*K] | 33.3 | 33.2 | 33.6 | 33.1 | 33.5 | 33.8 | 31.9 | 40 | 36 | 38.7 |
| Thermal cond. λ, (moist) | [mW/m*K] | 40.6 | 38.9 | | 35.2 | 37.2 | 37.4 | 36.1 | | | 42.1 |

We claim:

1. A process producing an in-situ foam comprising the following mixing components: comprising mixing components comprising:
   50 to 98 wt % of one or more inorganic fillers A),
   1 to 48 wt % of one or more cationic or amphoteric polymers B),
   0.5 to 48 wt % of one or more surfactants C),
   0.01 to 5 wt %, of one or more crosslinkers D) capable of reacting with said polymers B),
   0.5 to 10 wt % of one or more cell regulators E), selected from the group consisting of silicones, siliconates and carbon,
   0 to 20 wt % of one or more additives F),
   wherein the weight percentages of said components A) to F) are based on the nonaqueous fractions and the sum total of A) to F) does not exceed 100 wt %; and
   foaming with a gas or gas mixture under superatmospheric pressure and applying mechanical forces for producing an in-situ foam;
   wherein components B) and D) are stored separately and mixed together on site to produce the in-situ foam.

2. The process according to claim 1 comprising an alkali metal alkylsiliconate as cell regulator E).

3. The process according to claim 1 wherein polymer B) has a solubility in water of at least 5 wt % under standard conditions (20° C., 101.3 kPa) at pH 7.

4. The process according to claim 1 comprising a polyvinylamine or a poly(vinylamine-vinylformamide) copolymer as cationic polymer B).

5. The process according to claim 1 comprising a terpolymer comprising vinylamine, vinylformamide and sodium acrylate units as amphoteric polymer B).

6. The process according to claim 1 comprising calcium sulfate surface modified with amino, carboxyl and/or hydroxyl groups, aluminum silicates surface modified with amino, carboxyl and/or hydroxyl groups, or mixtures thereof as inorganic fillers A).

7. The process according to claim 1 comprising by way of surfactant C) at least one surfactant based on natural proteinaceous raw materials.

8. The process according to claim 1 comprising a dialdehyde as crosslinker D).

9. The process according to claim 1 wherein components B), C), and D) are employed in the form of aqueous solutions.

10. The process according to claim 1 comprising the steps of
    (a) introducing a gas or gas mixture into an aqueous solution or suspension comprising at least said component C),
    (b) foaming the aqueous solution or suspension via one or more mixing elements
    (c) adding components A), B), D), E) and F) together or separately before or after step (b) via one or more mixing elements,
    (d) drying to a water content below 5 wt %.

11. The process according to claim 10 wherein compressed air having a pressure in the range from 100 to 2000 kPa is introduced in step (a).

12. The process according to claim 10 wherein the aqueous solution or suspension in the last mixing element has a solids content in the range from 5 to 50 wt %.

13. The process according to claim 1, wherein the in-situ foam has a density in the range from 10 to 50 kg/m$^3$.

14. The process according to claim 1 wherein the in-situ foam has a heat of combustion below 3.0 MJ/kg, determined according to DIN 51900 part 3.

15. The process according to claim 1 wherein the in-situ foam is a foam for use in thermal insulation.

16. The process according to claim 1, further comprising filling cavities and hollow bodies with the in-situ foam.

17. The process according to claim 1 wherein the in-situ foam is a form for use as a fire barrier or as part of a fire barrier.

18. The process according to claim 1, wherein the components comprise from 1 to 10 wt. % of the one or more additives F), wherein the one or more additives F) are selected from the group consisting of starch, modified celluloses, guar bean flour ether, polyvinyl alcohol, functionalized alkyldioxysilanes or alkyltrioxysilanes, and combinations thereof.

* * * * *